US008551351B2

(12) United States Patent
Nakamoto

(10) Patent No.: US 8,551,351 B2
(45) Date of Patent: Oct. 8, 2013

(54) METHOD OF MANUFACTURING NOZZLE PLATE

(75) Inventor: Hikaru Nakamoto, Inuyama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 13/154,332

(22) Filed: Jun. 6, 2011

(65) Prior Publication Data

US 2011/0236590 A1 Sep. 29, 2011

Related U.S. Application Data

(62) Division of application No. 12/138,390, filed on Jun. 12, 2008, now abandoned.

(30) Foreign Application Priority Data

Jun. 12, 2007 (JP) ................................ 2007-154875

(51) Int. Cl.
*G01D 15/00* (2006.01)

(52) U.S. Cl.
USPC ................................ 216/27; 347/45; 347/47

(58) Field of Classification Search
USPC ........................ 106/31.58; 156/273.3, 275.5; 204/224 R; 205/118, 135, 143, 157, 205/181, 75; 257/737; 307/112; 347/20, 45, 347/47; 384/463; 427/487; 428/579; 429/492; 430/320
See application file for complete search history.

(56) References Cited

U.S. PATENT DOCUMENTS

| | | | | |
|---|---|---|---|---|
| 5,178,745 | A * | 1/1993 | Abys et al. | 205/219 |
| 5,863,371 | A | 1/1999 | Takemoto et al. | |
| 6,109,728 | A | 8/2000 | Kakuda et al. | |
| 6,290,331 | B1 | 9/2001 | Agarwal et al. | |
| 6,341,836 | B1 | 1/2002 | Koike et al. | |
| 6,390,599 | B1 | 5/2002 | Takemoto et al. | |
| 6,592,206 | B1 | 7/2003 | Suzuki et al. | |
| 7,530,667 | B2 | 5/2009 | Furukawa et al. | |
| 7,722,159 | B2 | 5/2010 | Hyakudome et al. | |

(Continued)

FOREIGN PATENT DOCUMENTS

| | | |
|---|---|---|
| CN | 1579778 A | 2/2005 |
| JP | H11-302895 A | 11/1999 |

(Continued)

OTHER PUBLICATIONS

Machine translation of JP 11-320893 pulled Jul. 30, 2012.*

(Continued)

*Primary Examiner* — Duy Deo
*Assistant Examiner* — Erin Bergner
(74) *Attorney, Agent, or Firm* — Baker Botts L.L.P.

(57) ABSTRACT

A nozzle plate has a nozzle hole for ejecting liquid, which penetrates in a thickness direction of the nozzle plate. An ejection face of the nozzle plate having an ejection opening of the nozzle hole is covered with a water-repellent coat having a through hole communicating with the nozzle hole. The through hole has a straight portion and a diameter expansion portion. The straight portion is contiguous to the nozzle hole and having the same diameter as the ejection opening. The diameter expansion portion is provided to interpose the straight portion with the nozzle hole and gradually expanding so that a part thereof farther from the straight portion has a larger diameter than a part thereof closer to the straight portion.

4 Claims, 4 Drawing Sheets

(56) References Cited

U.S. PATENT DOCUMENTS

| | | | | |
|---|---|---|---|---|
| 7,837,299 | B2 | 11/2010 | Mori | |
| 2003/0030697 | A1 | 2/2003 | Kwon et al. | |
| 2004/0160479 | A1 | 8/2004 | Huang et al. | |
| 2004/0165035 | A1 | 8/2004 | Silverbrook | |
| 2005/0035999 | A1 | 2/2005 | Kitahara et al. | |
| 2006/0061621 | A1 | 3/2006 | Seto | |
| 2006/0163725 | A1 * | 7/2006 | Haba et al. | 257/737 |
| 2006/0187259 | A1 | 8/2006 | Kojima | |
| 2007/0247492 | A1 | 10/2007 | Mori | |

FOREIGN PATENT DOCUMENTS

| | | | |
|---|---|---|---|
| JP | H11-320893 | A | 11/1999 |
| JP | 2000-263793 | A | 9/2000 |
| JP | 2002-219808 | A | 8/2002 |
| JP | 2003-266699 | A | 9/2003 |
| JP | 2004-122228 | A | 4/2004 |
| JP | 2004-169106 | A | 6/2004 |
| JP | 2006-051808 | A | 2/2006 |
| JP | 2008-143088 | A | 6/2008 |

OTHER PUBLICATIONS

The State Intellectual Property Office of the People's Republic of China; Notification of First Office Action in Chinese Patent Application No. 200810109451.3, mailed Nov. 20, 2009.

Japan Patent Office; Notice of Reasons for Rejection in Japanese Patent Application No. 2007-154875, mailed Apr. 21, 2009.

Japan Patent Office, Decision of Final Rejection for Japanese Patent Application No. 2007-154875, mailed Aug. 18, 2009.

* cited by examiner

METHOD OF MANUFACTURING NOZZLE PLATE

CROSS REFERENCE TO RELATED APPLICATION

The present application is a divisional application of U.S. patent application Ser. No. 12/138,390, filed on Jun. 12, 2008 which claims priority from Japanese Patent Application No. 2007-154875, filed on Jun. 12, 2007, the disclosures of which are incorporated by reference in their entirety.

BACKGROUND OF THE INVENTION

1. Field of the Invention

The present invention relates to a nozzle plate having a nozzle hole which ejects liquid and a manufacturing method thereof. The present invention especially relates to a nozzle plate whose ejection face has a water-repellent coat formed by electroplating, and a manufacturing method of the same.

2. Description of Related Art

An ink-jet head includes a nozzle plate having a plurality of nozzle holes through which ink droplets are ejected towards a recording medium. There is known a technique to prevent ink deposit near ejection openings of the nozzle holes, which are formed on an ejection face of the nozzle plate, and thus stabilize the ejection direction of ink droplets, by means of a water-repellent coat formed through electroplating on the ejection face (Refer to Japanese Unexamined Patent Publication No. 2002-219808). The publication suggests that a dispersion electrode be positioned near the ejection openings, and that the electric potential of the dispersion electrode be set equal to that of the nozzle plate during the electroplating, in order to homogenize the current density to prevent unevenness in the thickness of the water-repellent coat near the ejection opening, thereby forming the water-repellent coat with an even thickness.

SUMMARY OF THE INVENTION

According to the above publication, however, the water-repellent coat has a corner near each of the ejection opening. This may lead to the following problem. When wiping the ejection face of the nozzle plate with a wiper made of an elastic material such as rubber, foreign matters wiped off by the wiper during the wiping may adhere to the corner of the water-repellent coat. Moreover, there is a problem that the water-repellent coat is damaged by the wiper contacting the corner. The adhesion of the foreign matters or the damage caused by them leads variation in the ejection direction of ink droplets, consequently deteriorating the printing quality.

The object of the present invention is to provide a nozzle plate which is capable of preventing a disturbance of droplet ejection caused by adhesion of foreign matters to, or the damage to the water-repellent coat during wiping, and a manufacturing method of the same.

According to a first aspect of the present invention, there is provided a nozzle plate having a nozzle hole for ejecting liquid, which penetrates in a thickness direction of the nozzle plate. An ejection face of the nozzle plate having an ejection opening of the nozzle hole is covered with a water-repellent coat having a through hole communicating with the nozzle hole. The through hole has a straight portion and a diameter expansion portion. The straight portion is contiguous to the nozzle hole and has the same diameter as the ejection opening. The diameter expansion portion is provided to interpose the straight portion with the nozzle hole and gradually expands so that a part thereof farther from the straight portion has a larger diameter than a part thereof closer to the straight portion.

In the first aspect, foreign matters are likely to adhere to a part corresponding to the diameter expansion portion during wiping, rather than a part corresponding to the straight portion of the water-repellent coat. Thus, droplet ejection is less likely disturbed. Moreover, since the through hole has a diameter expansion portion near an exit thereof, wiper-caused damage to the water-repellent coat is avoided. Hence, the above structure prevents droplet ejection from being disturbed by the adhesion of foreign matters to the ejection opening or damage to the water-repellent coat during wiping.

In addition, since the through hole has the diameter expansion portion near the exit thereof, it is possible to prevent the wiper from being damaged by contacting the area near the exit of the through hole during wiping.

There is a possibility of the following problems taking place, if the through hole of the water-repellent coat does not have a straight portion, that is, in case the through hole has only a diameter expansion portion. Namely, the area near the exit of the through hole more likely forms an asymmetrical shape. This may cause a curvature in the droplet ejection direction. Moreover, this may cause re-ejection of droplet, since a vibration center of the meniscus is lead to be closer to the ejection face of the nozzle plate and thus vibration takes place after ejection of ink.

On the other hand, according to the above structure, since the through hole of the water-repellent coat has a straight portion, the shape of around the exit of the through hole can easily be symmetrical, so that the direction of droplet ejection is stabilized, and the vibration center of the meniscus becomes relatively far from the ejection face of the nozzle plate. Thus, re-ejection of a droplet as described above is prevented.

In addition, capillarity occurs at the straight portion having water repellency. Therefore, a tail of a droplet is pulled back, forming a new meniscus immediately after droplet ejection, thus allowing the next ejection in a short period of time.

Moreover, the water-repellent coat having a straight portion is thicker than a structure having only the diameter expansion portion. This contributes to an increased durability of the water-repellent coat. Thus, stable ink ejection can be continued for a long period of time.

According to a second aspect of the present invention, there is provided a method of manufacturing a nozzle plate having a nozzle hole, comprising the steps of; (a) forming the nozzle hole penetrating through an opaque conductive plate which becomes the nozzle plate, in a thickness direction of the conductive plate; (b) covering, with light-curable resin, a first surface of the conductive plate which surface has one opening of the nozzle hole to become an ejection opening, and supplying the light-curable resin into an area inside the nozzle hole contiguous to the one opening; (c) forming a cured resin portion from the light-curable resin by applying, to the conductive plate, light directed from a second surface of the conductive plate having the other opening of the nozzle hole to the first surface of the same so as to cure a part of the light-curable resin inside the nozzle hole and another part of the light-curable resin outside the nozzle hole, the another part overlapping the one opening in a direction from the second surface to the first surface; (d) eliminating an uncured portion of the light-curable resin after the step of (c); (e) forming a water-repellent coat by electroplating using the curable resin as a mask, after the step of (d); and (f) eliminating the cured resin portion after the step of (e). In the step of (e), a current density is adjusted so that the through hole, on the water-repellent coat, communicating with the nozzle hole has a straight portion and a diameter expansion portion, the straight portion being contiguous to the nozzle hole and having the same diameter as the ejection opening, the diameter expansion portion being provided to interpose the straight portion with the nozzle hole and gradually expanding so that a part thereof farther from the straight portion has a larger diameter than a part thereof closer to the same.

In the second aspect, simply adjusting the current density of electroplating enables manufacturing of a nozzle plate whose water-repellent coat is provided with a through hole having the straight portion and the diameter expansion portion.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

The following describes a preferred embodiment of the present invention with reference to the drawings. The following embodiment deals with an application of the present invention to a nozzle plate positioned to an ink-jet head.

Figure 1:
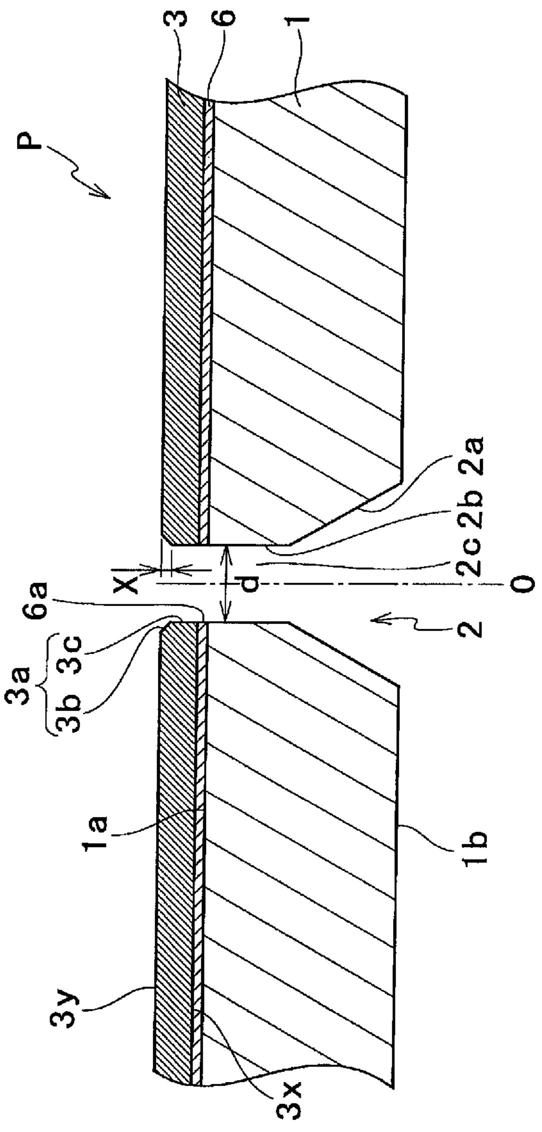
FIG. 1 is across sectional view of a nozzle plate according to an embodiment of the present invention.

First, the structure of a nozzle plate P according to the present embodiment will be described with reference to FIG. 1. The nozzle plate P has a substrate 1 made of stainless steel having a thickness of substantially 70 μm. The substrate 1 has a nozzle hole 2 which ejects ink formed through in a thickness direction.

The nozzle hole 2 is symmetrical to a central axis O, and includes a column portion 2*b* and a truncated cone portion 2*a*. The column portion 2*b* has a cylindrical circumference and opens towards the ejection face 1*a* of the substrate 1. The truncated cone portion 2*a* has a truncated cone shaped circumference and opens at the bottom towards a back surface 1*b*, which is the opposite side to the ejection face 1*a* of the substrate 1. The column portion 2*b* has a diameter d of substantially 20 to 30 μm. The top of the truncated cone portion 2*a* has the same diameter as that of the column portion 2*b* and is connected to the column portion 2*b*. The opening formed by the column portion 2*b* towards the ejection face 1*a* serves as an ejection opening 2*c* where ink is ejected. The ejection opening 2*c* has the smallest diameter within the nozzle hole 2.

The ejection face 1*a* is covered with a nickel coat 6 as an interface layer, and a water repellent coat 3 is formed on the nickel coat 6. The water-repellent coat 3 is made by nickel plating containing a fluorine-based macromolecular material such as polytetrafluoroethylene or the like, and has a thickness of substantially 1.5 μm. The nickel coat 6 does not contain a fluorine-based macromolecular material, and has a thickness of substantially 0.1 μm.

The nickel coat 6 and the water-repellent coat 3 respectively have through holes 6*a* and 3*a* which share the central axis O with the nozzle hole 2, and communicate with the nozzle hole 2. The ejection opening 2*c* of the nozzle hole 2, or an inner wall of the column portion 2*b* are not obturated by the nickel coat 6 or the water-repellent coat 3. To the contrary, areas other than the ejection opening 2*c* of the ejection face 1*a* are covered with the nickel coat 6 and the water-repellent coat 3.

The through hole 3*a* of the water-repellent coat 3 includes a straight portion 3*c* and a diameter expansion portion 3*b*. The straight portion 3*c* is contiguous to the nozzle hole 2 and has the same diameter d as the ejection opening 2*c*. The diameter expansion portion 3*b* is provided to interpose the straight portion 3*c* with the nozzle hole 2, and gradually expands so that a part thereof farther from the straight portion 3*c* has a larger diameter than a part thereof closer to the straight portion 3*c*. The diameter expansion portion 3*b* has a circumference curved so as to protrude towards the central axis O of the through hole 3*a*, where the axial direction length x along the central axis O is 0.1 μm or more but 0.5 μm or less. The water-repellent coat 3 has a lower surface 3*x* where the straight portion 3*c* is open and an upper surface 3*y* where the diameter expansion portion 3*b* is open. The lower surface 3*x* extends parallel to the ejection face 1*a*. The upper surface 3*y* extends parallel to the lower surface 3*x* and is distant from the lower surface 3*x* along the axis O. The through hole 6*a* of the nickel coat 6 has the same diameter d as the ejection opening 2*c*, that is, the same diameter d as the straight portion 3*c*. Thus, a cylindrical airspace having the diameter d is formed from the column portion 2*b* to the straight portion 3*c*.

As mentioned above, according to the nozzle plate P of the present embodiment, foreign matters are likely to adhere to a part corresponding to the diameter expansion portion 3*b*, i.e., adhere to the boundary of the upper surface 3*y* and the diameter expansion portion 3*b*, during wiping, rather than a part corresponding to the straight portion 3*c* of the water-repellent coat 3. Thus, ink ejection is less likely disturbed. Moreover, since the through hole 3*a* has the diameter expansion portion 3*b* near the exit thereof, the wiper-caused damage to the water-repellent coat 3 is avoided. Hence, the structure of the present embodiment prevents ink ejection from being disturbed by the adhesion of foreign matters to the ejection opening 2*c* or damage to the water-repellent coat 3 during wiping.

In addition, since the through hole 3*a* has the diameter expansion portion 3*b* near the exit thereof, it is possible to prevent the wiper from being damaged by contacting the area near the exit of the through hole 3*a* during wiping.

There is a possibility of the following problems taking place, if the through hole 3*a* of the water-repellent coat 3 does not have the straight portion 3*c*, that is, in case the through hole 3*a* has only the diameter expansion portion 3*b*. Namely, the area near the exit of the through hole 3*a* more likely forms an asymmetrical shape. This may cause a curvature in the droplet ejection direction. Moreover, this may cause re-ejection of droplet, since a vibration center of the meniscus is lead to be closer to the ejection face 1*a* of the nozzle plate P and thus vibration takes place after ejection of ink.

On the other hand, the through hole 3*a* of the water-repellent coat 3 having a straight portion 3*c* as in the present embodiment brings about the following advantages. Namely, the area near the exit of the through hole 3*a* can easily form a symmetrical shape. This stabilizes the ink ejection direction.

Moreover, since the vibration center of the meniscus is relatively far from the ejection face 1_a_ of the nozzle plate P, the above mentioned re-ejection of ink is prevented.

In addition, capillarity occurs at the straight portion 3_c_ having water repellency. Therefore, a tail of ink is pulled back, forming a new meniscus immediately after ink ejection, thus allowing the next ejection in a short period of time.

Moreover, the water-repellent coat 3 having the straight portion 3_c_ is thicker than a structure having only the diameter expansion portion 3_b_. This contributes to an increased durability of the water-repellent coat 3. Thus, stable ink ejection can be continued for a long period of time.

In addition, the circumference of the diameter expansion portion 3_b_ curves so as to protrude towards the central axis O of the through hole 3_a_. Thus, a part corresponding to the diameter expansion portion 3_b_, a part corresponding to the straight portion 3_c_, and the outer surface of the water-repellent coat 3 can be respectively connected smoothly. Thus, the above structure can further restrain the damage by the wiper to the water-repellent coat 3 and the wiper itself during wiping.

As described below, if the axial direction length x of the diameter expansion portion 3_b_ is less than 0.1 μm, the boundary of the upper surface 3_y_ and the diameter expansion portion 3_b_ becomes too close to the ejection opening 2_c_ in a plan view. If the axial direction length x of the diameter expansion portion 3_b_ is 0.1 μm, for example, the above boundary is placed substantially 1 μm distant from the circumference of the ejection opening 2_c_ in a plan view. If the axial direction length x of the diameter expansion portion 3_b_ is 0.5 μm, the boundary is placed substantially 7 to 8 μm distant from the circumference of the ejection opening 2_c_ in a plan view. Therefore, taking the sizes and the shapes of foreign matters in consideration, if the axial direction length x of the diameter expansion portion 3_b_ is less than 0.1 μm, there will be a higher possibility of foreign matters adhering to the part corresponding to the straight portion 3_c_ of the water-repellent coat during wiping, and the ink ejection is more conspicuously disturbed by the adherence of foreign matters.

If the axial direction length x exceeds 0.5 μm, it is necessary to decrease the current density of the electroplating in the water-repellent coat forming step. Thus, it takes longer to form a water-repellent coat. If it takes longer to form a water-repellent coat, a below-mentioned curable resin 5 immersed into a plating solution may swell. The curable resin 5 defines a diameter of the straight portion 3_c_ of the water-repellent coat 3. Accordingly, the swelling of the curable resin 5 may cause unevenness in the diameter of the straight portion 3_c_.

In view of that, the thickness of the water-repellent coat 3 is limited to about 1.5 μm, and the axial direction length x of the diameter expansion portion 3_b_ is set to 0.1 μm or more but 0.5 μm or less, as in the present embodiment. That way, it is possible to prevent the ink ejection from being disturbed by the adherence of foreign matters, and to shorten the manufacturing time.

Here, when the axial direction length x of the diameter expansion portion 3_b_ is 0.5 μm, the production time is as short as substantially twenty minutes. Thus, the straight portion 3_c_ will not at all be formed with an uneven diameter.

Moreover, the substrate 1 is made of stainless steel, and the nickel coat 6 thinner than the water-repellent coat 3 is formed between the substrate 1 and the water-repellent coat 3. Therefore, the adhesivity of the water-repellent coat 3 to the substrate 1 increases.

Figure 2:
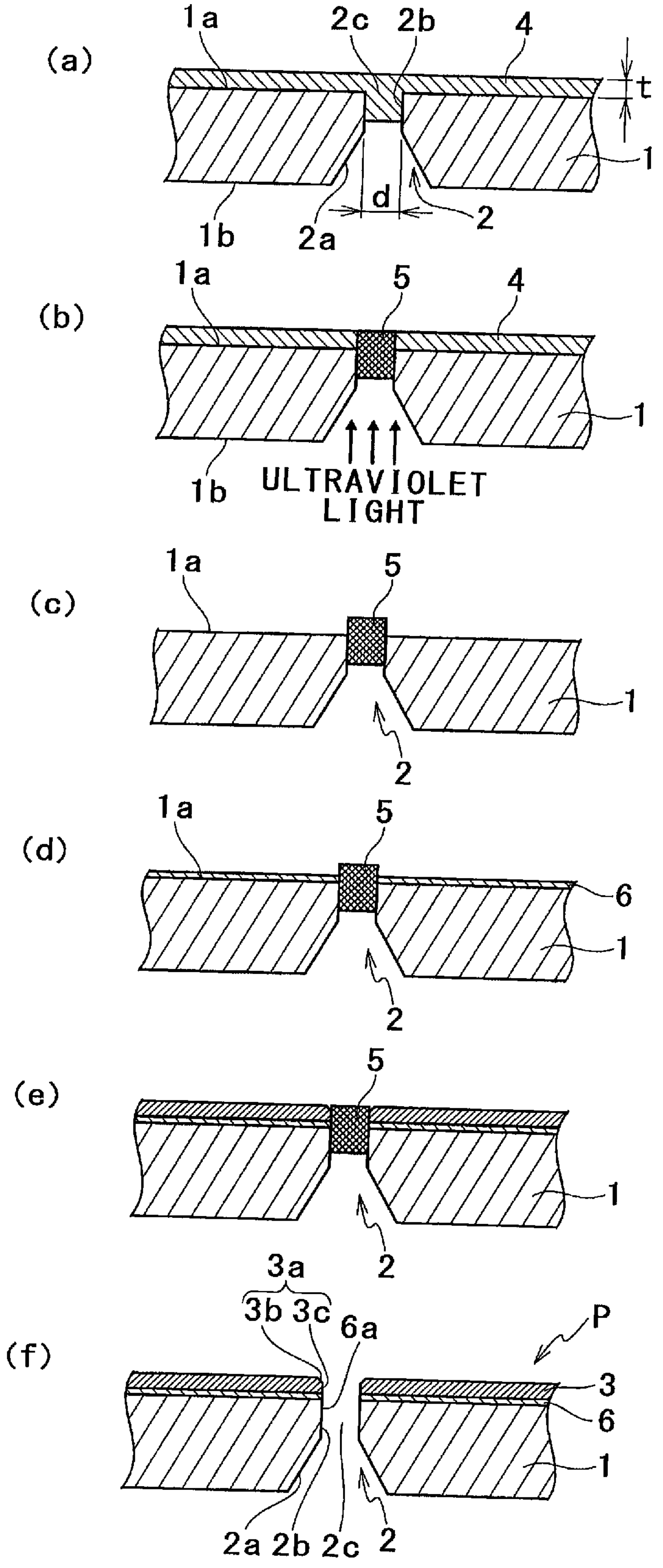
FIG. 2 is an explanatory diagram showing a manufacturing method of the nozzle plate, where (a), (b), (c), (d), (e), (f), respectively show a light-curable resin supplying step, a curing step, an uncured portion eliminating step, a nickel coat forming step, a water-repellent coat forming step, and a curable resin eliminating step.

Next, the manufacturing method of the nozzle plate P with reference to FIG. 2 is described.

First, by carrying out a pressing to form the truncated cone portion 2_a_ and the column portion 2_b_, the nozzle hole 2 is formed to a substrate 1 (nozzle hole forming step). If the pressing generates a protrusion such as a burr to the ejection face 1_a_, grinding and polishing is carried out to eliminate the protrusion. The nozzle hole 2 may be formed by etching.

Thereafter, as shown in FIG. 2 (_a_), a film of a light-curable resin 4 serving as a resist is heated and crimped at the same time to the ejection face 1_a_ of the substrate 1 with a use of a roller or the like. The ejection face 1_a_ is covered with the light-curable resin 4, while adjusting the heating temperature, the pressure, the speed of the roller, or the like. Then, a predetermined amount of the light-curable resin 4 is supplied to the leading end area of the column portion 2_b_ of the nozzle hole 2 (light-curable resin supplying step). Note that if the heating temperature is too high, such as a case where the temperature is far beyond the glass transition point, the light-curable resin 4 begins to show liquidity, and the ejection face 1_a_ therefore cannot be coated with the light-curable resin 4 having a necessary film thickness (for example, substantially 15 μm). To the contrary, if the heating temperature is too low, the film does not soften so that the necessary amount of light-curable resin 4 cannot be supplied to the leading end area of the column portion 2_b_.

In view of that, the heating temperature is set, for example, at the glass transition point where the light-curable resin 4 begins to show a soft rubber-like characteristic.

Note that, the heating temperature is preferably set within the range of 80° C. to 100°; however, the temperature is not limited to this range.

Moreover, to easily supply a necessary amount of the light-curable resin 4 to the leading end area of the column portion 2_b_, the thickness t of the light-curable resin 4 is preferably equal to or smaller than the diameter d of the column portion 2_b_.

Then, as shown in FIG. 2 (_b_), ultraviolet light emitted in a direction from the back-surface 1_b_ of the substrate 1 towards the ejection face 1_a_ is applied to the substrate 1 in order to partially cure the light-curable resin 4 (curing step).

A part of the light-curable resin 4 inside the nozzle hole 2 and another part of the light-curable resin 4 outside the nozzle hole 2 which overlaps the ejection opening 2_c_ in the direction from the back-surface 1_b_ to the ejection face 1_a_ are cured by the light passing through the nozzle hole 2. Hence, a cylinder-shaped curable resin 5 is formed. The substrate 1 where the nozzle hole 2 is formed functions as a mask during the irradiance of ultraviolet light. Thus, the diameter of the curable resin 5 is substantially the same as that of the ejection opening 2_c_ at any point along the axial direction. Here, the light exposure is adjusted in order to prevent the light-curable resin 4 from curing outwardly from nearby the ejection opening 2_c_ in the radial direction of the nozzle hole 2.

Thereafter, an uncured portion of the light-curable resin 4 on the ejection face 1_a_, that is a section other than the curable resin 5, is eliminated with a developer such as an alkaline developer containing 1%-$Na_2CO_3$ (uncured portion eliminating step). Thus, as shown in FIG. 2 (_c_), cured resin 5 is left protruded from the ejection face 1_a_. In the present embodiment, the protrusion distance of the curable resin 5 from the ejection face 1_a_ is substantially 15 μm, and is greater than the total thickness of later formed nickel coat 6 and water-repellent coat 3.

Then, electroplating is carried out with the curable resin 5 left unremoved, so as to form a nickel coat 6 of substantially 0.1 μm in thickness on the ejection face 1_a_ (nickel coat forming step). Note that the curable resin 5 functions as a mask against the plating coat. In this step, as shown in FIG. 2 (_d_), the nickel coat 6 is not formed on a nonmetal curable resin 5, but selectively grows on the conductive substrate 1. Note that the curable resin 5 is left protruded from the upper surface of the nickel coat 6.

Afterwards, as shown in FIG. 2 (*e*), a water-repellent coat 3 is formed on the nickel coat 6 by electroplating, using the curable resin 5 as a mask (water-repellent coat forming step). In this step, the current density of the electroplating is adjusted so that, where a position which is a distance x (see FIG. 1) away from the upper surface 3*y* of the water-repellent coat 3 is a reference position, the inner circumference of the water-repellent coat 3 below the reference position contacts the curable resin 5, while the inner circumference above the reference position does not contact the curable resin 5 but gradually distances from the curable resin 5 in such a manner that a part of the inner circumference farther from the ejection face 1*a* is farther distanced from the curable resin 5 than a part of the inner circumference closer to the ejection face 1*a*. In other words, the current density is adjusted so as to form in the water-repellent coat 3, the through-hole 3*a* having the straight portion 3*c* and the diameter expansion 3*b*. More specifically, the current density of the electroplating is 0.5 $A/dm^2$ or higher but 2 $A/dm^2$ or lower.

The current density of 0.5 $A/dm^2$ produces a water-repellent coat 3 with the diameter expansion portion 3*b* having an axial direction length x of substantially 0.5 μm. The current density of 2 $A/dm^2$ produces a water-repellent coat 3 with the diameter expansion portion 3*b* having an axial direction length x of substantially 0.1 μm. The plating time to form a water-repellent coat 3 is substantially 20 minutes when the current density is 0.5 $A/dm^2$, and is substantially 5 minutes when the current density is 2 $A/dm^2$. In either case, a water-repellent coat 3 having a total thickness of substantially 1.5 μm is formed. Note that the temperature of the plating solution is substantially 50° C.

After the formation of the water-repellent coat 3 through the above method, a release agent which is 3%-NaOH or the like is used to melt the curable resin 5 and eliminate it from the substrate 1 (curable resin eliminating step). Thus, as shown in FIG. 2 (*f*), there is completed a nozzle plate P where the ejection opening 2*c* of the nozzle hole 2 is open via the through hole 6*a* of the nickel coat 6 and the through hole 3*a* of the water-repellent coat 3.

As mentioned above, according to the method of the present embodiment for manufacturing a nozzle plate P, simply adjusting the current density of electroplating enables manufacturing of a nozzle plate P whose water-repellent coat 3 is provided with a through hole 3*a* having the straight portion 3*c* and the diameter expansion portion 3*b*.

In addition, the substrate 1 is made of stainless steel, and a nickel coat forming step is carried out prior to the water-repellent coat forming step, to form a nickel coat 6 thinner than the water-repellent coat 3 on the ejection face 1*a* of the substrate 1. Then, through the water-repellent coat formation step the water-repellent coat 3 is formed on the nickel coat 6. That way the adhesivity of the water-repellent coat 3 to the substrate 1 increases.

The nickel coat 6 may be formed by electroless plating; however, in this case, it is necessary to prepare a production equipment for nickel coat 6 formation, aside from the production equipment for water-repellent coat formation. When the nickel coat 6 is formed by the same electroplating for forming the water-repellent coat 3 as in the present embodiment, it is possible to simplify the production equipments and avoid complication of steps since the production equipments other than the plating solutions can be shared.

As described below, if the current density of the electroplating in the water-repellent coat forming step is 2 $A/dm^2$ or higher, the axial direction length x of the diameter expansion portion 3*b* decreases. This increases the possibility of the adhesion of foreign matters to the part corresponding to the straight portion 3*c* of the water-repellent coat 3 during wiping. Consequently, the interference of ink ejection due to the adhesion of foreign matters becomes conspicuous. Moreover, formation of the water-repellent coat takes a long time, if the current density is lower than 0.5 $A/dm^2$. The formation taking a long time may cause unevenness in the diameter of the straight portion 3*c*.

In view of that, the current density of the electroplating in the water-repellent coat forming step is set at 0.5 $A/dm^2$ or higher but 2 $A/dm^2$ or lower as in the present embodiment. That way, it is possible to prevent the ink ejection from being disturbed by the adherence of foreign matters, and to shorten the manufacturing time.

Next, an exemplary variation of the manufacturing method according to the present embodiment is described. The below exemplary variation is the same as the method described in the foregoing embodiment except the water-repellent coat forming step. That is, only the water-repellent coat forming step is carried out in a different manner from the above.

More specifically, in the water-repellent coat forming step, electroplating is carried out first at a current density of 4 $A/dm^2$ or higher, and then, another electroplating is carried out at a current density of 0.5 $A/dm^2$ or higher but 2 $A/dm^2$ or lower. In this case, electroplating is carried out at a current density of 4 $A/dm^2$ or higher in the beginning of the water-repellent forming step. This forms the most part of the thickness of the water-repellent coat 3, including the straight portion 3*c*. Then, with an application of a current density lower than that of the beginning of the step, the diameter expansion portion 3*b* is formed.

According to the exemplary variation, most part of the thickness of the water-repellent coat 3 can be formed in a relatively short period of time at the beginning of the step. Thus, the time taken for forming the entire water-repellent coat 3 is reduced. This is particularly effective for forming a thicker water-repellent coat 3. In addition, the current density applied afterwards is set at 0.5 $A/dm^2$ or higher but 2 $A/dm^2$ or lower. That way, it is possible to prevent the ink ejection from being disturbed by the adherence of foreign matters, and to shorten the manufacturing time.

Next, the following describes an experiment conducted on the current density of the electroplating in the water-repellent coat forming step. In the experiment used was a substrate 1 of 70 μm in thickness which is made of SUS 430 and has a nozzle hole 2 having a column portion 2*b* whose diameter d is 20 μm. Thereafter, the light-curable resin 4 was crimped, while heating the same, to an ejection face 1*a* of the substrate 1. Then, the ejection face 1*a* was covered with the light-curable resin 4 of substantially 15 μm in thickness, and a predetermined amount of the light-curable resin 4 was supplied to the leading end area of the column portion 2*b* of the nozzle hole 2. Afterwards, the curable resin 5 was formed by partially curing the light-curable resin 4 by applying ultraviolet light. After eliminating the uncured portion of the light-curable resin 4, the nickel coat 6 having a thickness of 0.1 μm was formed on the ejection face 1*a* by electroplating. Then, the current density of the electroplating in the water-repellent coat forming step was changed. Then, the resulting axial direction length x of the diameter expansion portion 3*b* in the water-repellent coat 3, and the resulting foreign matter deposit ratio, i.e., a hole-edge foreign matter deposit ratio, to the part corresponding to the straight portion 3*c* during wiping, were examined. The thickness of the water-repellent coat 3 was set to 1.5 μm.

Note that the hole-edge foreign matter deposit ratio is a ratio of the number of nozzle holes 2 where foreign matters adhered to the part corresponding to the straight portion 3*c* by wiping, to the total number of nozzle holes 2. Hereinafter, the hole-edge foreign matter deposit ratio is called simply as the "ratio".

Figure 3:
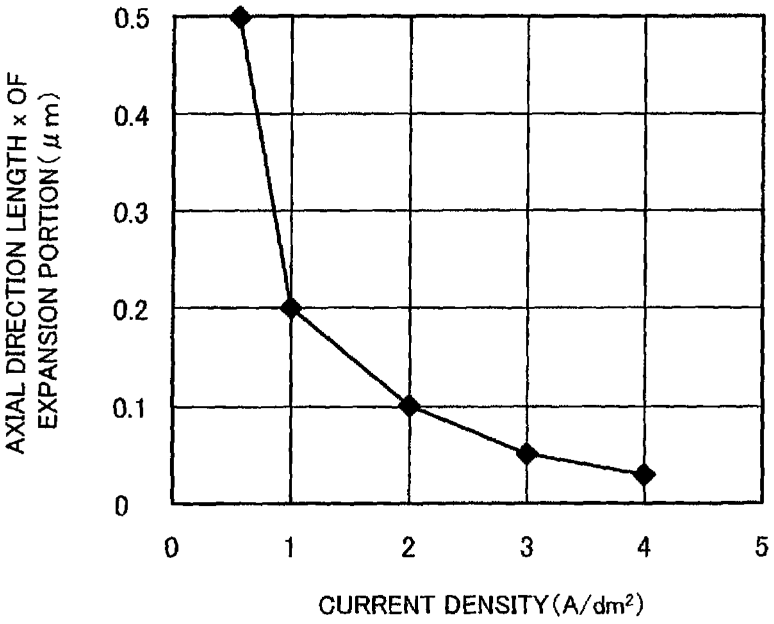
FIG. 3 is a graph showing the relation of the current density of electroplating and the axial direction length of the diameter expansion portion in the water-repellent coat forming step.
Figure 4:
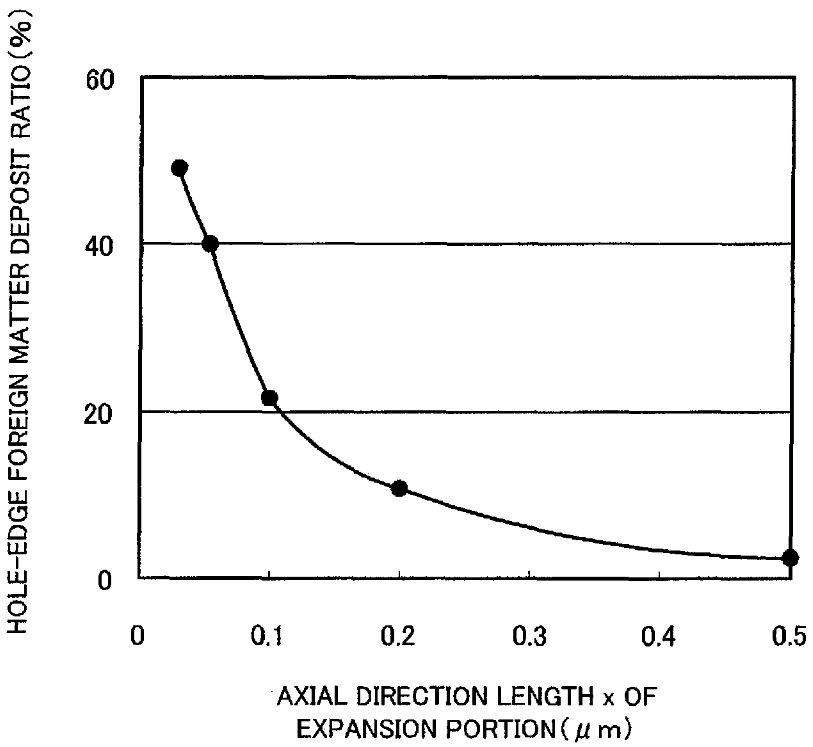
FIG. 4 is a graph showing the relation of the axial direction length of the diameter expansion portion and a hole-edge foreign matter deposit ratio.

FIG. 3 is a graph showing the relation of the current density of the electroplating and the axial direction length x of the diameter expansion portion 3*b* in the water-repellent coat forming step. FIG. 4 is a graph showing the relation of the axial direction length x of the diameter expansion portion 3*b* and the ratio.

As shown in FIG. 3, when the current density is 0.5 A/dm$^2$, the axial direction length x of the diameter expansion portion 3*b* is 0.5 μm, and the ratio is substantially 3%. The axial direction length x of the diameter expansion portion 3*b* decreases with an increase in the current density, and is substantially 0.03 μm when the current density is 4 A/dm$^2$. If the current density exceeds 4 A/dm$^2$, the axial direction length x of the diameter expansion portion 3*b* is predicted to be asymptotic to 0 μm. Moreover, as shown in FIG. 4, the ratio increases when the axial direction length x of the diameter expansion portion 3*b* decreases. Once the axial direction length x of the diameter expansion portion 3*b* falls below 0.1 μm, the ratio rapidly increases with a decrease in the length. When the axial direction length x of the diameter expansion portion 3*b* is substantially 0.03 μm, i.e., when the current density is 4 A/dm$^2$, the ratio is 50%. If the axial direction length x of the diameter expansion portion 3*b* falls below 0.03 μm, i.e., if the current density exceeds 4 A/dm$^2$, the ratio is predicted to be asymptotic to a high-rate exceeding 50%.

Thus, it is found that, with an increase in the current density, the axial direction length x of the diameter expansion portion 3*b* decreases and the hole-edge foreign matter deposit rate increases.

It is understood by FIG. 4 that the longer the axial direction length x of the diameter expansion portion 3*b*, the more difficult it becomes for foreign matters to adhere to the part corresponding to the straight portion 3*c* during wiping. Moreover, it is understood that when the axial direction length x of the diameter expansion portion 3*b* approaches 0, that is when the diameter expansion portion 3*b* barely exists and the through hole 3*a* is formed only with the straight portion 3*c*, foreign matters adhere more easily to the section corresponding to the straight portion 3*c* during wiping.

In short, it is understood that the diameter expansion portion 3*b* contributes to the prevention of adhesion of foreign matters to the part corresponding to the straight portion 3*c*.

If foreign matters adhere to the part corresponding to the straight portion 3*c*, the ink ejection from the nozzle hole 2 is disturbed by foreign matters, causing variation in the direction of ink ejection, thus deteriorating the printing quality. In view of that, it is important to form the diameter expansion portion 3*b* so as to highly contribute to the prevention of foreign matter adhesion. Moreover, the diameter expansion portion 3*b* preferably maintains a high contribution to the prevention of foreign matter adhesion, even when the manufacturing condition changes more or less. As seen in FIG. 4, the ratio rapidly increases with a decrease in the axial direction length x of the diameter expansion portion 3*b*, once the length falls below 0.1 μm. When the axial direction length x of the diameter expansion portion 3*b* is 0.1 μm or more, the change in the ratio to the change in the axial direction length x of the diameter expansion portion 3*b* becomes smaller, and the ratio becomes lower than substantially 20% constantly.

According to FIG. 3, in order to form the water-repellent coat 3 with the axial direction length x of the diameter expansion portion 3*b* of 0.1 μm or more, current density should be set as 2 A/dm$^2$ or lower. On the other hand, it is necessary to consider manufacturing time and evenness in the diameter of the straight portion 3*c*. Therefore, the current density is preferably set to at least the value where the water-repellent coat 3 having the axial direction length x of the diameter expansion portion 3*b* of 0.5 μm is formed, i.e., the value of 0.5 A/dm$^2$.

Accordingly, in the water-repellent coat formation step, the current density of the electroplating is preferably set at 0.5 A/dm$^2$ or higher but 2 A/dm$^2$ or lower so that the axial direction length x of the diameter expansion portion 3 is 0.1 μm or more but 0.5 μm or less.

In the experiment, the axial direction length x of the diameter expansion portion 3*b* and the broadening of the diameter expansion portion 3*b* from the straight portion 3*c* were both measured with a non-contact surface roughness measure (More specifically, a non-contact three-dimensional surface formation/roughness measure made by Zygo: New View 5032).

Note that the substrate 1 of the nozzle plate P is not limited to one made of stainless steel, and may be one made of a different material.

The formation of the nickel coat 6 is not limited to electroplating, and other methods such as non-electroplating or the like are possible.

The present invention is not limited to a structure in which a nickel coat 6 is formed between the ejection face 1*a* and the water-repellent coat 3. For example, instead of the nickel coat 6, the ejection face 1*a* and the water-repellent coat 3 may interpose a chrome plating coat, a copper plating coat, a lamination of several plating films, or the like. Alternatively, the water-repellent coat 3 may be directly formed on the ejection face 1*a* with no layer interposed therebetween.

The circumference of the diameter expansion portion 3*b* does not have to be curved so as to protrude towards the central axis O of the through hole 3*a*.

To prevent ink ejection from being disturbed by the adhesion of foreign matters, and to shorten the manufacturing time, the axial direction length x of the diameter expansion portion 3*b* is preferably 0.1 μm or more but 0.5 μm or less; however, the range of the axial direction length x is not limited to this. Especially, the axial direction length x of the diameter expansion portion 3*b*, when it exceeds 0.5 μm, is preferably in a range where the diameter of the straight portion 3*c* is unlikely uniformed.

To prevent ink ejection from being disturbed by the adhesion of foreign matters, and to shorten the manufacturing time, the current density of the electroplating in the water-repellent coat forming step is preferably 0.5 A/dm$^2$ or higher but 2 A/dm$^2$ or lower; however, the range of the current density is not limited to the this. For example, the current density may be 0.5 A/dm$^2$ or lower, for the reason that the ratio is reduced as much as possible. In this case, however, a caution is required to avoid unevenness in the diameter of the straight portion 3*c*. This limits the amount of manufacturing time extendable.

The light applied to the substrate 1 in the curing step advances in a direction from the back-surface 1 of the substrate 1 towards the ejection face 1*a*; however, it can advance in a direction other than the above direction, as long as the light includes a component directed in the above direction.

In the curing step, the curing of the curable resin 5 does not have to be completely cured, and may be half-cured. Doing so will leave adhesiveness in curable resin 5, since cure reaction is not completed. With this adhesiveness, it is less likely that the curable resin 5 falls due to vibration and shock in the later steps.

The nozzle plate and the manufacturing method thereof are applicable to ink-jet heads and various types of other equipments.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method of manufacturing a nozzle plate having a nozzle hole, comprising the steps of;

(a) forming the nozzle hole penetrating through an opaque conductive plate which becomes the nozzle plate, in a thickness direction of the conductive plate;

(b) covering, with light-curable resin, a first surface of the conductive plate which surface has one opening of the nozzle hole to become an ejection opening, and supplying the light-curable resin into an area inside the nozzle hole contiguous to the one opening;

(c) forming a cured resin portion from the light-curable resin by applying, to the conductive plate, light directed from a second surface of the conductive plate having the other opening of the nozzle hole to the first surface of the same so as to cure a part of the light-curable resin inside the nozzle hole and another part of the light-curable resin outside the nozzle hole, the another part overlapping the one opening in a direction from the second surface to the first surface;

(d) eliminating an uncured portion of the light-curable resin after the step of (c);

(e) forming a water-repellent coat by electroplating using the curable resin as a mask, after the step of (d), wherein the water-repellent coat is formed by electroplating with a first current density and then with a second current density which is less than the first current density and is equal to or greater than 0.5 A/dm$^2$ and equal to or less than 2A/dm$^2$; and (f) eliminating the cured resin portion after the step of (e), wherein in the step of (e), a current density is adjusted so that the through hole, on the water-repellent coat, communicating with the nozzle hole has a straight portion and a diameter expansion portion with an axial direction length greater than or equal to 0.1 microns and less than or equal to 0.5 microns, the straight portion being contiguous to the nozzle hole and having the same diameter as the ejection opening, the diameter expansion portion being provided to interpose the straight portion with the nozzle hole and gradually expanding so that a part thereof farther from the straight portion has a larger diameter than a part thereof closer to the straight portion.

2. The method of manufacturing the nozzle plate according to claim 1, wherein:

the conductive plate is made of stainless steel;

the method further includes a step of (g) forming a nickel coat thinner than the water-repellent coat on the first surface of the conductive plate, before the step of (e); and in the step of (e) the water-repellent coat is formed on the nickel coat.

3. The method of manufacturing the nozzle plate according to claim 2, wherein, in the step of (g), the nickel coat is formed by electroplating.

4. The method of manufacturing the nozzle plate according to claim 1, wherein, in the step of (e), the water-repellent coat is formed so as to have a third surface where the straight portion is open and a fourth surface where the diameter expansion portion is open, the third surface extending parallel to the ejection face, the fourth surface extending parallel to the third surface and being distant from the third surface along the central axis of the through hole.

* * * * *